US005431455A

United States Patent [19]

Seely

[11] Patent Number: 5,431,455
[45] Date of Patent: Jul. 11, 1995

[54] RECREATIONAL VEHICLE SEWER HOSE CONTAINMENT ASSEMBLY

[76] Inventor: Stanley W. Seely, 11204 NW. 40th Ave., Vancouver, Wash. 98685

[21] Appl. No.: 286,508

[22] Filed: Aug. 5, 1994

[51] Int. Cl.⁶ .................. F16L 3/00; A47G 29/00
[52] U.S. Cl. ..................... 285/61; 285/404; 285/62; 248/49
[58] Field of Search .............. 248/49, 75; 285/61, 285/62, 404, 298

[56] References Cited

U.S. PATENT DOCUMENTS

| 958,752 | 5/1910 | Mackensen | 285/404 |
|---|---|---|---|
| 3,493,204 | 2/1970 | Prouty | 248/49 |
| 3,730,228 | 5/1973 | Gibbs, Sr. | 285/61 |
| 3,819,137 | 6/1974 | Smith | 248/49 |
| 3,951,436 | 4/1976 | Hyde, Jr. | 295/404 |
| 4,169,571 | 10/1979 | Duggan | 248/49 |
| 4,223,702 | 9/1980 | Cook | 285/302 |
| 4,228,978 | 10/1980 | Rand | 248/49 |
| 4,406,434 | 9/1983 | Schneckloth | 248/49 |
| 4,844,121 | 7/1989 | Duke | 248/87 |

Primary Examiner—Eric K. Nicholson

[57] ABSTRACT

A recreational vehicle sewer hose containment assembly comprising a plurality of rigid linear tubes telescopically mated to define a housing, with the housing adapted for receiving a sewer hose of a recreational vehicle therein and with the housing contractible in a stowed configuration and extendable in an operable configuration; an adjustment mechanism coupled to the housing for fixedly setting the telescopic extension and alignment of the tubes thereof; and a coupling mechanism coupleable to the housing and coupleable with a recipient surface therebelow for placing the housing in a stationary operable configuration.

2 Claims, 4 Drawing Sheets

RECREATIONAL VEHICLE SEWER HOSE CONTAINMENT ASSEMBLY

BACKGROUND OF THE INVENTION

1. Field of the Invention

The present invention relates to a recreational vehicle sewer hose containment assembly and more particularly pertains to holding a sewer hose attached to a recreational vehicle in a stationary position for removal of sewage therefrom with a recreational vehicle sewer hose containment assembly.

2. Description of the Prior Art

The use of recreational vehicle sewer hose attachments is known in the prior art. More specifically, recreational vehicle sewer hose attachments heretofore devised and utilized for the purpose of removing sewage from a recreational vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,811,462 to Feliz discloses a recreational vehicle utility stowage and transfer system. U.S. Pat. No. 4,133,347 to Mercer discloses a waste evacuation attachment for recreational vehicles. U.S. Pat. No. 4,228,978 to Rand discloses a recreational vehicle sewer hose support. U.S. Pat. No. 4,796,926 to Rapsilver discloses a dump fitting for sewer hose. U.S. Pat. No. 4,905,939 to Horn discloses a sewer hose supporter. U.S. Pat. No. 5,141,017 to Trottier discloses a recreational vehicle sewage removal adapter with back-flushing capability.

While these devices fulfill their respective, particular objective and requirements, the aforementioned patents do not describe a recreational vehicle sewer hose containment assembly for holding a sewer hose attached to a recreational vehicle in a stationary operable configuration for removal of sewage from the recreational vehicle or for holding a sewer hose in a stowed configuration for transport by the recreational vehicle.

In this respect, the recreational vehicle sewer hose containment assembly according to the present invention substantially departs from the conventional concepts and designs of the prior art, and in doing so provides an apparatus primarily developed for the purpose of holding a sewer hose attached to a recreational vehicle in a stationary position for removal of sewage therefrom.

Therefore, it can be appreciated that there exists a continuing need for new and improved recreational vehicle sewer hose containment assembly which can be used for holding a sewer hose attached to a recreational vehicle in a stationary position for removal of sewage therefrom. In this regard, the present invention substantially fulfills this need.

SUMMARY OF THE INVENTION

In the view of the foregoing disadvantages inherent in the known types of recreational vehicle sewer hose attachments now present in the prior art, the present invention provides an improved recreational vehicle sewer hose containment assembly. As such, the general purpose of the present invention, which will be described subsequently in greater detail, is to provide a new and improved recreational vehicle sewer hose containment assembly and method which has all the advantages of the prior art and none of the disadvantages.

To attain this, the present invention essentially comprises, in combination, a first, a second, a third, and a fourth rigid linear plastic tube. Each tube has a central axis, a tip end, and a base end. The second, third, and fourth tube each further have an elongated slot formed thereon at a location adjacent to each base end. Each slot is aligned with each central axis of each tube. The base end of the second tube is telescopically and frictionally received within the tip end of the first tube, the base end of the third tube is telescopically and frictionally received within the tip end of the second tube, and the base end of the fourth tube is telescopically and frictionally received within the tip end of the third tube to define a housing adapted for receiving a flexible and contractible sewer hose of a recreational vehicle therein. The housing is telescopically contractible in a stowed configuration and telescopically extendable in an operable configuration.

A first, a second, a third, a fourth, and a fifth rigid collar is included with the first collar integrally coupled about the first tube near the base end thereof, the second collar integrally coupled about the tip end of the first tube, the third collar integrally coupled about the tip end of the second tube, the fourth collar integrally coupled about the tip end of the third tube, and the fifth collar integrally coupled to the fourth tube near the tip end thereof. The second, third, and fourth collar each have a pair of diametrically opposed, vertically positioned, and threaded upper and lower coupling holes disposed thereon and a pair of diametrically opposed and horizontally positioned eyelets formed thereon. Each eyelet has a outwardly angled bore therethrough. Each bore has a plurality of spaced projections extended radially inwards adapted for frictionally holding an anchor stake therein.

A first, a second, and a third rigid thumbscrew is included with the first thumbscrew threadably coupled within the upper coupling hole of the second collar and abuttable against the second tube, the second thumbscrew threadably coupled within the upper coupling hole of the third collar and abuttable against the third tube, and the third thumbscrew threadably coupled within the upper coupling hole of the fourth collar and abuttable against the fourth tube. Tightening the first, second, and third thumbscrews sets the telescopic extension of the second tube from the first tube, the telescopic extension of the third tube from the second tube, and the telescopic extension of the fourth tube from the third tube, respectively. Loosening the first, second, and third thumbscrews allows the telescopic adjustment of the second tube from the first tube, the telescopic adjustment of the third tube from the second tube, and the telescopic adjustment of the fourth tube from the third tube, respectively.

A first, a second, and a third dog point set screw is included with the first dog point set screw threadably coupled within the lower coupling hole of the second collar and positionable within the slot of the second tube, the second dog point screw threadably coupled within the lower coupling hole of the third collar and positionable within the slot of the third tube, and the third dog point set screw threadably coupled within the lower coupling hole of the fourth collar and positionable within the slot of the fourth tube. Tightening the first, second, and third dog point set screws such that each extends into the respective slot ensures congruent and fixed alignment of the central axes of the tubes of the housing and prevents inadvertent misalignment when a flexible and contractible sewer hose of a recreational vehicle is disposed therein.

A first, a second, a third, a fourth, and a fifth pair of rigid and elongated anchor stakes is included. Each anchor stake has a head end and a tip end. Each anchor stake of the first pair is frictionally coupled within a bore of a separate eyelet on the first collar. Each anchor stake of the second pair is frictionally coupled within a bore of a separate eyelet on the second collar. Each anchor stake of the third pair is frictionally coupled within a bore of a separate eyelet on the third collar. Each anchor stake of the fourth pair is frictionally coupled within a bore of a separate eyelet on the fourth collar. Each anchor stake of the fifth pair is frictionally coupled within a bore of a separate eyelet on the fifth collar. The tip ends of the stakes are adapted to be pushed into a recipient surface therebelow for placing the housing in a stationary operable configuration.

A rack is included and formed of two elongated, spaced, and aligned holding members. Each holding member is coupled to the first tube. The holding members have symmetrically opposed pin snaps formed thereon for holding the first, second, third, fourth, and fifth pairs of anchor stakes in a stowed configuration such that the pairs are aligned in parallel with the central axes of the tubes. Lastly, a base end cap and a tip end cap are included with the base end cap coupleable over the base end of the first tube and the tip end cap coupleable over the tip end of the fourth tube for allowing a contractible recreational vehicle sewer hose to be held in a stowed configuration within the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved recreational vehicle sewer hose containment assembly which has all the advantages of the prior art recreational vehicle sewer hose attachments and none of the disadvantages.

It is another object of the present invention to provide a new and improved recreational vehicle sewer hose containment assembly which may be easily and efficiently manufactured and marketed.

It is a further object of the present invention to provide a new and improved recreational vehicle sewer hose containment assembly which is of durable and reliable construction.

An even further object of the present invention is to provide a new and improved recreational vehicle sewer hose containment assembly which is susceptible of a low cost of manufacture with regard to both materials and labor, and which accordingly is then susceptible of low prices of sale to the consuming public, thereby making such a recreational vehicle sewer hose containment assembly economically available to the buying public.

Still yet another object of the present invention is to provide a new and improved recreational vehicle sewer hose containment assembly which provides in the apparatuses and methods of the prior art some of the advantages thereof, while simultaneously overcoming some of the disadvantages normally associated therewith.

Even still another object of the present invention is to provide a new and improved recreational vehicle sewer hose containment assembly for holding a sewer hose attached to a recreational vehicle in a stationary position for removal of sewage therefrom.

Lastly, it is an object of the present invention to provide a new and improved recreational vehicle sewer hose containment assembly comprising a plurality of rigid linear tubes telescopically mated to define a housing, with the housing adapted for receiving a sewer hose of a recreational vehicle therein and with the housing contractible in a stowed configuration and extendable in an operable configuration; adjustment means coupled to the housing for fixedly setting the telescopic extension and alignment of the tubes thereof; and coupling means coupleable to the housing and coupleable with a recipient surface therebelow for placing the housing in a stationary operable configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
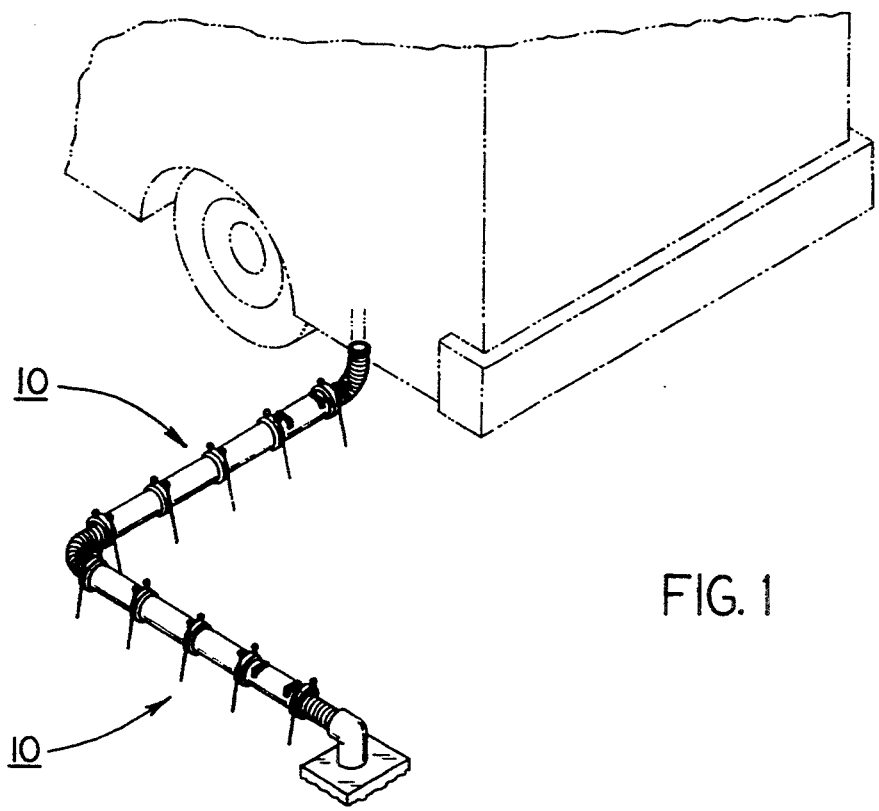
FIG. 1 is a perspective view of two embodiments of the present invention secured about a sewer hose of a recreational vehicle.
Figure 2:
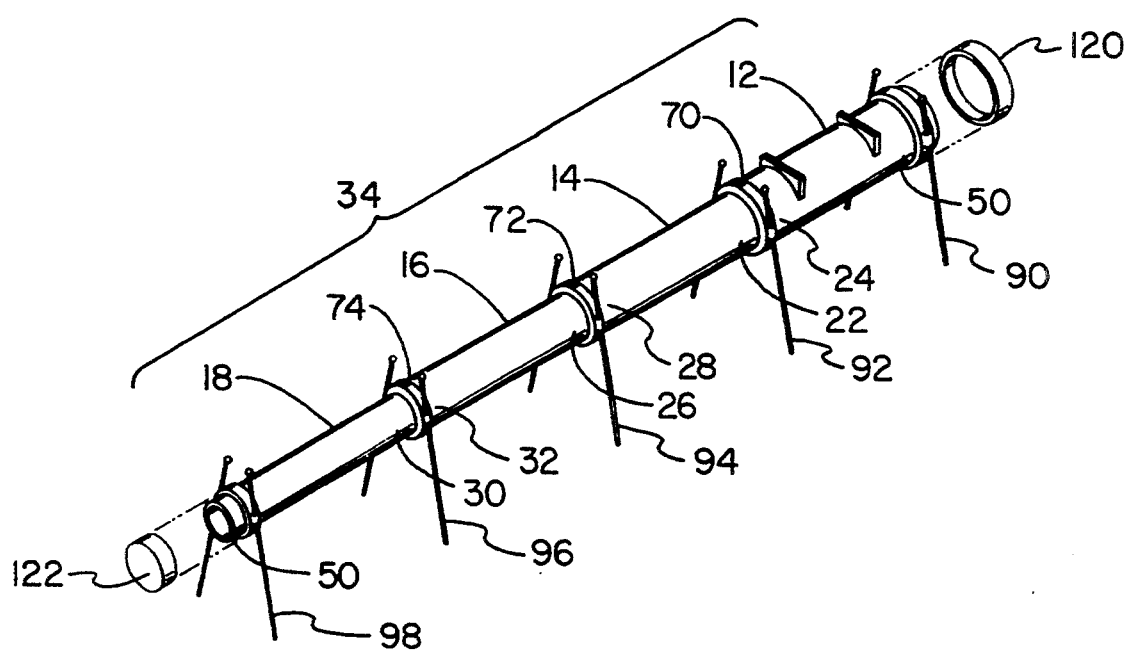
FIG. 2 is a perspective view of the preferred embodiment constructed in accordance with the principles of the present invention in an operable configuration.
Figure 3:
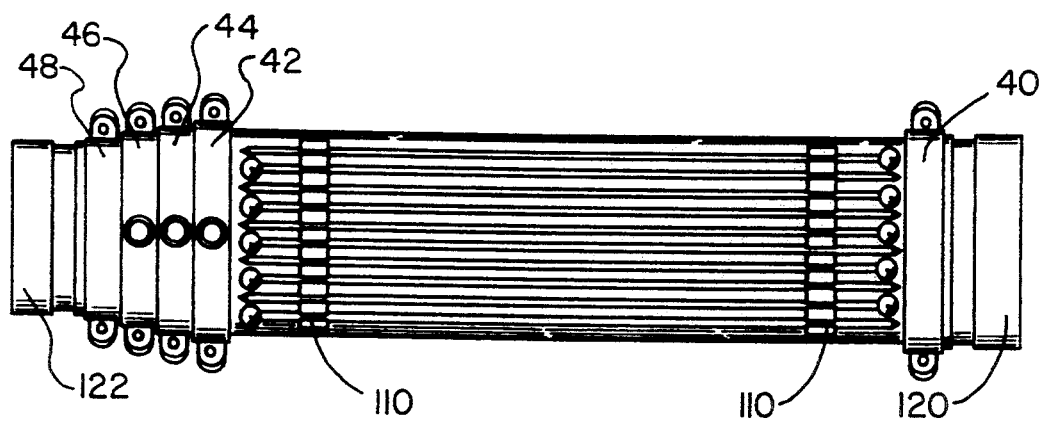
FIG. 3 is a plan view of the present invention in a stowed configuration.
Figure 4:
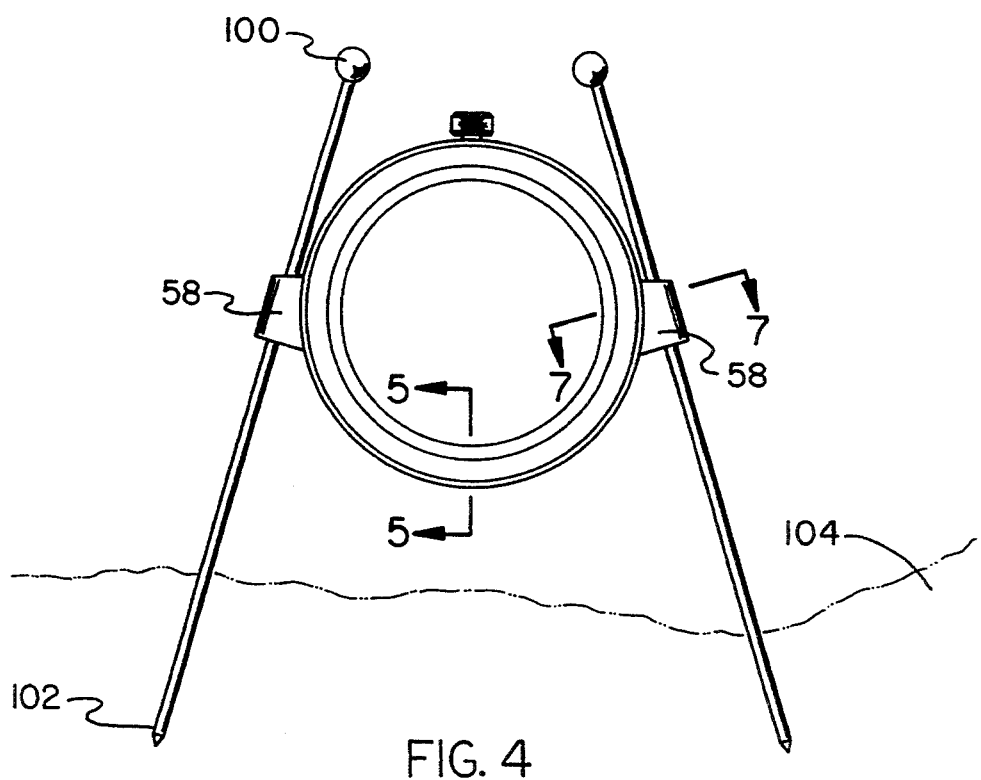
FIG. 4 is a side-elevational view of the present invention secured within a recipient surface therebelow.
Figure 5:
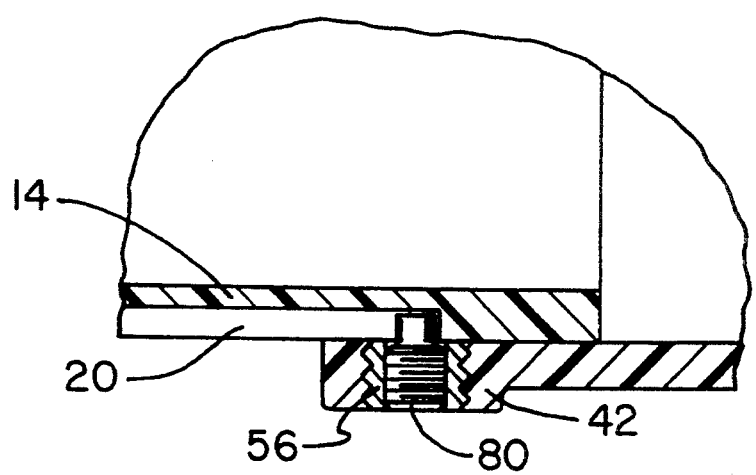
FIG. 5 is a cross-sectional view of the present invention taken along the line 5—5 of FIG. 4.
Figure 6:
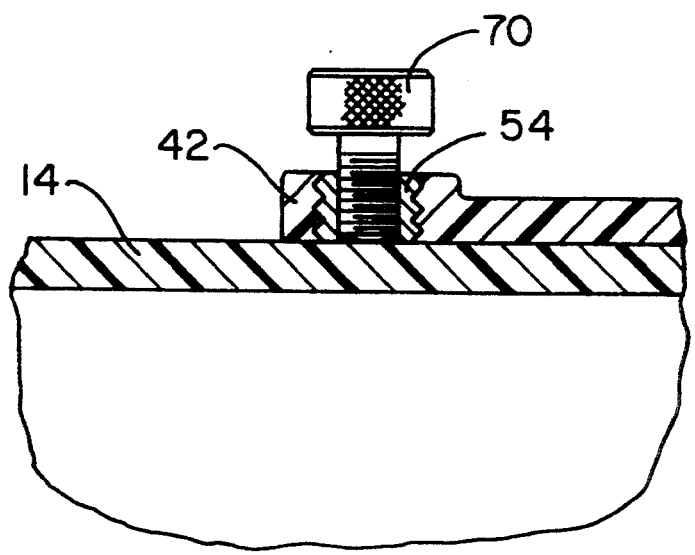
FIG. 6 is a cross-sectional view of a thumb screw used for holding two mated tubes of the present invention at a selected telescopic extension.
Figure 7:
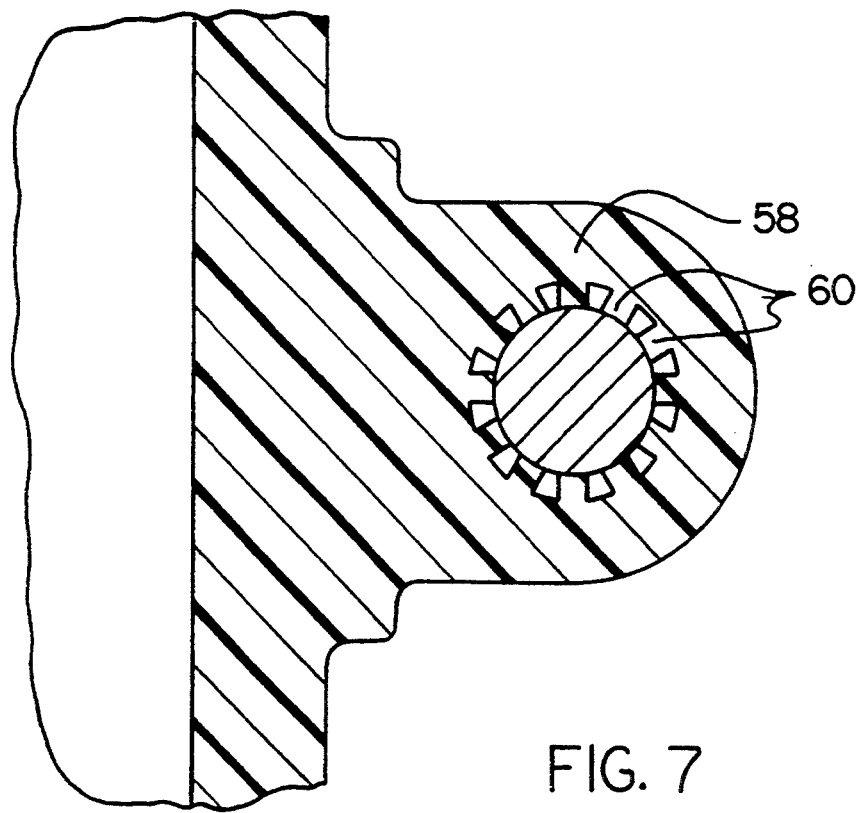
FIG. 7 is a cross-sectional view of the coupling between an eyelet of a tube and an anchor stake taken along the line 7—7 of FIG. 4.
Figure 8:
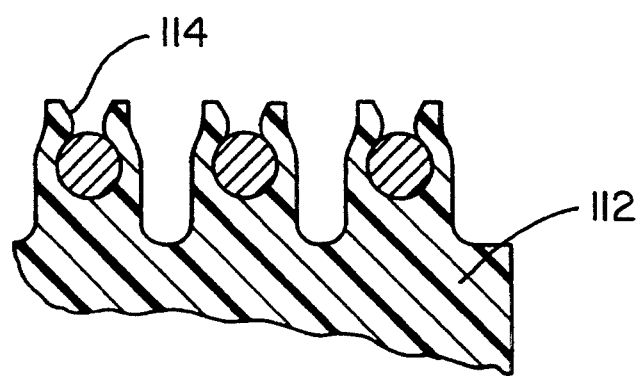
FIG. 8 is a cross-sectional view of the coupling between the rack and the anchor stakes in a stowed configuration.

With reference now to the drawings, and in particular, to FIGS. 2 through 8 thereof, the preferred embodiment of the new and improved recreational vehicle sewer hose containment assembly embodying the principles and concepts of the present invention and generally designated by the reference number 10 will be described.

Specifically, the present invention includes six major components. The major components are the tubes, thumb screws, dog point set screws, anchor stakes, rack, and caps. These components are interrelated to provide the intended function.

More specifically, it will be noted in the various Figures that the first major component is the tubes. The present invention includes a first tube 12, a second tube 14, a third tube 16, and a fourth tube 18. The first, second, third, and fourth tubes are rigid and linear in structure and formed of plastic. Each tube has a central axis, a tip end, and a base end. The second, third, and fourth tubes each further include an elongated slot 20 formed thereon. Each slot is positioned at a location adjacent to the base end of each tube and aligned with the central axis thereof. The base end 22 of the second tube is telescopically and frictionally received within the tip end 24 of the first tube. The base end of the third tube 26 is telescopically and frictionally received within the tip end 28 of the second tube. The base end 30 of the fourth tube is telescopically and frictionally received within the tip end 32 of the third tube. The telescopic mating of the first, second, third, and fourth tubes define a housing 34 adapted for receiving a flexible and contractible sewer hose of a recreational vehicle therein. The housing is telescopically contractible in a stowed configuration and telescopically extendable in an operable configuration.

Each tube also includes one or more integral collars. The first tube 12 includes a first collar 40 integrally coupled thereto near the base end 50 thereof. The first tube also includes a second collar 42 integrally coupled thereto at the tip end 24 thereof. The second tube includes a third collar 44 integrally coupled thereto at the tip end 28 thereof. The third tube 16 includes a fourth collar 46 integrally coupled thereto at the tip end 32 thereof. The fourth tube 18 includes a fifth collar 48 integrally coupled thereto near the tip end 52 thereof. Although integrally coupled to the tubes in the preferred embodiment, in an alternate embodiment the collars could be provided as separate components. The second, third, and fourth collar each have a pair of diametrically opposed, vertically positioned, and threaded upper and lower coupling holes 54, 56 disposed thereon. The second, third, and fourth collar each further have a pair of diametrically opposed and horizontally positioned eyelets 58 formed thereon. Each eyelet has a downwardly projected and outwardly angled bore therethrough. Each bore has a plurality of spaced projections 60 extended radially inwards therefrom. These projections are adapted for frictionally holding an anchor stake within the bore.

The second major component is the thumb screws. The present invention includes a first thumb screw 70, a second thumb screw 72, and a third thumb screw 74. Each thumb screw is rigid in structure and has a threaded end and a knurled head for allowing a user a firm grip. The first thumb screw is threadably coupled within the upper coupling hole of the second collar 42 and abuttable against the second tube 14. The second thumb screw is threadably coupled within the upper coupling hole of the third collar 44 and abuttable against the third tube 16. The third thumb screw is threadably coupled within the upper coupling hole of the fourth collar 46 and abuttable against the fourth tube 18. Tightening the first thumb screw sets the telescopic extension of the second tube from the first tube. Tightening the second thumb screw sets the telescopic extension of the third tube from the second tube. Tightening the third thumb screw sets the telescopic extension of the fourth tube from the third tube. Alternately, loosening the first thumb screw allows the telescopic adjustment of the second tube from the first tube. Loosening the second thumb screw allows the telescopic adjustment of the third tube from the second tube. Lastly, loosening the third thumb screw allows the telescopic adjustment of the fourth tube from the third tube.

The third major component is the dog point set screws. The present invention includes a first dog point set screw 80, a second dog point set screw, and a third dog point set screw. Each dog point set screw is rigid in structure and has a threaded end and a recessed socket head adapted for receiving a wrench. The first dog point set screw 80 is threadably coupled within the lower coupling hole of the second collar 42 and positionable within the slot of the second tube. The second dog point set screw is threadably coupled within the lower coupling hole of the third collar 44 and positionable within the slot of the third tube 16. The third dog point set screw is threadably coupled within the lower coupling hole of the fourth collar 46 and positionable within the slot of the fourth tube 18. Tightening the first dog point set screw, the second dog point set screw, and the third dog point set screw such that each extends into its respective corresponding slot insures congruent and fixed alignment of the central axes of the tubes of the housing. Furthermore, the coupling of the dog point set screws within the slots of the tubes prevents inadvertent misalignment of the housing when a flexible and contractible sewer hose is disposed therein.

The fourth major component is the anchor stakes. The present invention includes a first pair of anchor stakes 90, a second pair of anchor stakes 92, a third pair of anchor stakes 94, a fourth pair of anchor stakes 96, and a fifth pair of anchor stakes 98. Each anchor stake is elongated and rigid in structure. Each anchor stake is formed of metal, plastic, or other similar rigid material. Each anchor stake has a head end 100 and a tip end 102. Each anchor stake of the first pair is frictionally coupled within a bore of a separate eyelet on the first collar 40. Each anchor stake of the second pair is frictionally coupled within a bore of a separate eyelet on the second collar 42. Each anchor stake of the third pair is frictionally coupled within a bore of a separate eyelet on the third collar 44. Each anchor stake of the fourth pair is frictionally coupled within a bore of a separate eyelet on the fourth collar 46. Lastly, each anchor stake of the fifth pair is frictionally coupled within a bore of a separate eyelet on the fifth collar 48. The tip ends of each of the anchor stakes is adapted to be pushed into a recipient surface 104 such as dirt, turf, snow, or the like therebelow for placing the housing in a stationary operable configuration.

The fifth major component is the rack 110. The rack is rigid in structure and formed of plastic or metal. The rack is formed with two elongated, spaced, and aligned holding members 112. Each holding member is coupled to the first tube 12. Each holding member includes pin snaps 114 formed thereon. The pin snaps are used for holding the first pair of anchor stakes 90, the second pair of anchor stakes 92, the third pair of anchor stakes 94, the fourth pair of anchor stakes 96, and the fifth pair of anchor stakes 98 in a stowed configuration. The pin snaps on the holding members are symmetrically aligned such that the pairs of anchor stakes are positioned in parallel with the central axes of the tubes when placed in the stowed configuration.

The sixth major component is the caps. The present invention includes a rubber base end cap 120 and a rubber tip end cap 122. The base end cap is coupleable over the base end 50 of the first tube. The tip end cap is coupleable over the tip end 52 of the fourth tube. The end caps allow a contractible recreational vehicle sewer hose to be held in a stowed configuration within the housing for transport with a recreational vehicle.

The present invention is plastic, tubular telescoping housing for a flexible contractible recreational vehicle or trailer sewer hose. The present invention simplifies the dumping of sewage from holding tanks of a recreational vehicle. The present invention serves for convenient and proper sewer hookup at any recreational vehicle park. The preferred embodiment consists of four telescoping tubes. These are kept in alignment by a grooves on the tubes and dog point set screws. The telescopic extension of the housing can be set by tightening the three thumb screw knobs and thereby prevent contraction thereof due to the natural shrinking property of the flexible contractible sewer hose. To achieve proper grade for optimum drainage, the present invention's ten adjustable anchor stakes can be inserted into a recipient surface at a variety of depths. The legs are angled for stability. The anchor stakes hold their set position by friction within the bore of each eyelet. The anchor stakes may be independently adjusted by simply pushing or pulling each to a desired position, thereby eliminating the need to level the housing on uneven terrain. Additional embodiments of the present invention in sequence may be disposed about a recreational vehicle sewer hose to accommodate its length or to maneuver it around objects. The rack coupled to the housing is used for placing the anchor stakes in a stowed configuration. The present invention is portable and easy to store. Rubber end caps are coupleable either end for allowing sewer hose containment in a stowed configuration within the housing. The approximate weight of the present invention is 12 lbs. The length of the present invention can vary to accommodate a sewer hose. The preferred diameter of the housing of the present invention is about 5 inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A recreational vehicle sewer hose containment assembly for holding a sewer hose attached to a recreational vehicle in a stationary position for removal of sewage therefrom comprising, in combination:

a first, a second, a third, and a fourth rigid linear plastic tube, each tube having a central axis, a tip end, and a base end with second, third, and fourth tube each further having an elongated slot formed thereon at a location adjacent to the base end and aligned with the central axis and with the base end of the second tube telescopically and frictionally received within the tip end of the first tube, the base end of the third tube telescopically and frictionally received within the tip end of the second tube, and the base end of the fourth tube telescopically and frictionally received within the tip end of the third tube to define a housing adapted for receiving a flexible and contractible sewer hose of a recreational vehicle therein, the housing telescopically contractible in a stowed configuration and telescopically extendable in an operable configuration;

a first, a second, a third, a fourth, and a fifth rigid collar with the first collar integrally coupled about the first tube near the base end thereof, the second collar integrally coupled about the tip end of the first tube, the third collar integrally coupled about the tip end of the second tube, the fourth collar integrally coupled about the tip end of the third tube, and the fifth collar integrally coupled to the fourth tube near the tip end thereof and with the second, third, and fourth collar each having a pair of diametrically opposed, vertically positioned, and threaded upper and lower coupling holes disposed thereon and a pair of diametrically opposed and horizontally positioned eyelets formed thereon, each eyelet having a outwardly angled bore therethrough and with each bore having a plurality of spaced projections extended radially inwards therefrom adapted for frictionally holding an anchor stake therein;

a first, a second, and a third rigid thumbscrew with the first thumbscrew threadably coupled within the upper coupling hole of the second collar and abuttable against the second tube, the second thumbscrew threadably coupled within the upper coupling hole of the third collar and abuttable against the third tube, and the third thumbscrew threadably coupled within the upper coupling hole of the fourth collar and abuttable against the fourth tube;

a first, a second, and a third dog point set screw with the first dog point set screw threadably coupled within the lower coupling hole of the second collar and positionable within the slot of the second tube, the second dog point screw threadably coupled within the lower coupling hole of the third collar and positionable within the slot of the third tube, and the third dog point set screw threadably coupled within the lower coupling hole of the fourth collar and positionable within the slot of the fourth tube;

a first, a second, a third, a fourth, and a fifth pair of rigid and elongated anchor stakes, each anchor stake having a head end and a tip end, each anchor stake of the first pair frictionally coupled within a bore of a separate eyelet on the first collar, each anchor stake of the second pair frictionally coupled within a bore of a separate eyelet on the second collar, each anchor stake of the third pair frictionally coupled within a bore of a separate eyelet on the third collar, each anchor stake of the fourth pair frictionally coupled within a bore of a separate eyelet on the fourth collar, and each anchor stake of the fifth pair frictionally coupled within a bore of a separate eyelet on the fifth collar and with the tip ends of the stakes adapted to be pushed into a recipient surface therebelow for placing the housing in a stationary operable configuration;

a rack formed of two elongated, spaced, and aligned holding members each coupled to the first tube and with the holding members having symmetrically opposed pin snaps formed thereon for holding the first, second, third, fourth, and fifth pairs of anchor stakes in a stowed configuration such that the pairs are aligned in parallel with the central axes of the tubes; and a base end cap and a tip end cap with the base end cap coupleable over the base end of the first tube and the tip end cap coupleable over the tip end of the fourth tube for allowing a contractible recreational vehicle sewer hose to be held in a stowed configuration within the housing.

2. A recreational vehicle sewer hose containment assembly comprising:

a plurality of rigid linear tubes telescopically mated to define a housing having a base end and a tip end with the housing adapted for receiving a sewer hose of a recreational vehicle therein and with the housing contractible in a stowed configuration and extendable in an operable configuration;

a plurality of collars secured about the housing, each collar having a plurality of eyelets formed thereon;

a plurality of thumbscrews securable between mated tubes for fixedly setting the telescopic extension and alignment of the housing;

a plurality of anchor stakes each removably secured within a eyelet of a collar on the housing and each further coupleable with a recipient surface therebelow for placing the housing in a stationary operable configuration;

a base end cap and a tip end cap with the base end cap coupleable over the base end of the housing and the tip end cap coupleable over the tip end of the housing for allowing a recreational vehicle sewer hose to be held in a stowed configuration therein; and rack means for securing the anchor stakes to the housing in a stowed configuration.

* * * * *